UNITED STATES PATENT OFFICE.

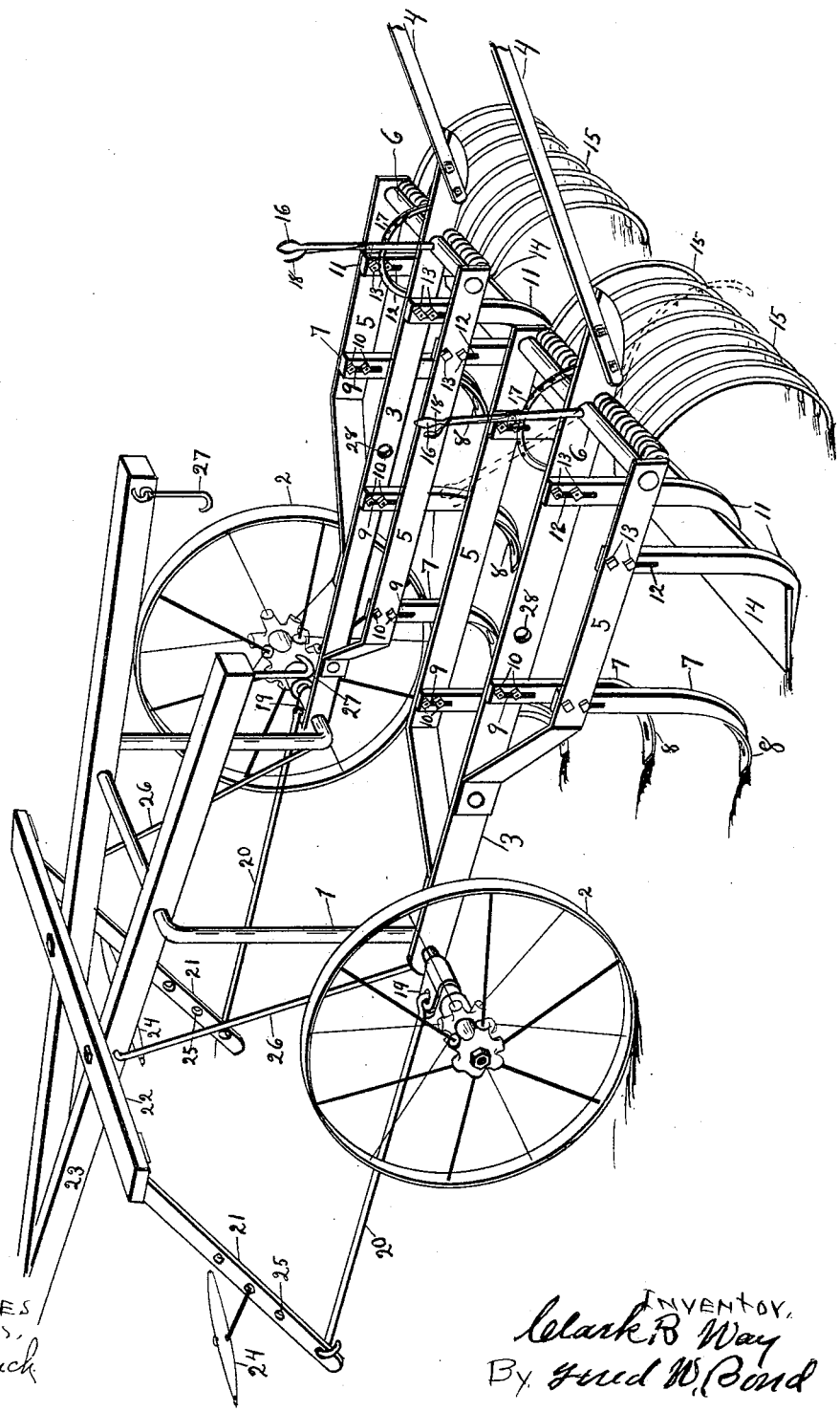

CLARK B. WAY, OF SHREVE, OHIO.

CULTIVATOR.

SPECIFICATION forming part of Letters Patent No. 613,341, dated November 1, 1898.

Application filed January 7, 1898. Serial No. 665,921. (No model.)

*To all whom it may concern:*

Be it known that I, CLARK B. WAY, a citizen of the United States, residing at Shreve, in the county of Wayne and State of Ohio, have invented certain new and useful Improvements in Cultivators; and I do hereby declare that the following is a full, clear, and exact description of the same, reference being had to the annexed drawing, making a part of this specification, and to the figures of reference marked thereon, in which the illustration is a perspective view of the cultivator, showing the different parts properly arranged and connected.

The present invention has relation to cultivators; and it consists in the different parts and combination of parts hereinafter described, and particularly pointed out in the claim.

In the accompanying drawing, 1 represents the axle, which is arched or bent upward in its center portion, substantially as shown in the drawing. To the horizontal portions of the axle 1 are journaled the traveling wheels 2, which wheels are secured in position in the usual manner. To the axle 1 are pivotally attached the bars 3, which bars extend any desired distance rearward, and to their rear ends are connected the handles 4. To the bars 3 are attached the bars 5, which bars 5, together with the bars 3, constitute the cultivator-frame proper, and, as shown, there are two cultivator-frames, each independently hinged to the axle 1. For the purpose of holding the rear ends of the bars of the frames in proper position with reference to each other the bars 6 are provided, said bars being for the additional purpose hereinafter described.

To the bars 3 and 5 are attached the cultivator-arms 7, to the bottom or lower ends of which are attached the shovels 8.

For the purpose of adjusting the arms 7 up or down they are each provided with the slots 9, said arms being held at the desired point of adjustment by means of the clamping-bolts 10.

To the rear of the arms 7 are located the arms 11, which arms are adjustably attached by means of the slots 12 and the clamping-bolts 13. The arms 11 are preferably arranged upon each frame so that they will be parallel with the axle when the frames are at right angles to the said axle, this arrangement being for the purpose hereinafter described. To the bottom ends of the arms 11 are attached the cutting-blades 14, which blades come directly behind the shovels 8 and are for the purpose of cutting any weeds that are not disturbed or cut by the shovels.

It will be understood that by locating the cutting-blades parallel to the axle 1 the cutting edges of said blades will come directly against any object, by which arrangement the frames are not thrown to one side. The cutting-blades 14 should be so adjusted that they will come a little below the top of the ground.

For the purpose of gathering the weeds the rake-teeth 15 are provided, which rake-teeth are attached to the bars 6. The bars 6 are so arranged that they can be turned or rocked by means of the levers 16, which levers are securely attached to the bars 6 in any desired manner.

For the purpose of holding the teeth at any desired point of adjustment the notched segments 17 are provided and the catch-bars 18. It will be understood that the teeth 15 can be so adjusted that they will simply agitate the ground, or they may be so adjusted that they will clear the surface.

To the axle 1 are attached the clips 19, to which clips are pivotally attached the rods 20, said rods being connected at their front ends to the bars 21, the upper ends of which bars 21 are attached to the bar 22 or its equivalent. The bar 22 is attached to the tongue 23 in any convenient and well-known manner. For the purpose of adjusting the singletrees 24 up or down the apertures 25 are provided. For the purpose of bracing the tongue 23 the rods 26 are provided, the lower ends of which are attached to the axle 1 and their upper ends to the tongue. The rear end of the tongue 23 is provided with the hooks 27, which are for the purpose of holding the frames of the cultivator in an elevated position when it is desired to move the cultivator proper from one field to another or upon the highway, said hooks engaging the apertures 28.

It will be understood that the rake-teeth should be formed of suitable spring material and may be provided with the ordinary loops, as shown.

It will be understood that by my arrangement of the different parts of the cultivator proper I am enabled to better destroy the weeds and grass than heretofore.

Having fully described my invention, what I claim as new, and desire to secure by Letters Patent, is—

The combination of an arched axle having wheels mounted thereon, bars pivotally attached to the axle, having frames connected thereto, shovel-arms adjustably attached to the frames, arms 11 adjustably attached and provided with cutting-blades, bars 6 located at the rear ends of the frames and provided with rake-teeth, operating-levers attached to the rake-bars and means for holding the operating-levers and rake-teeth in set adjustment, substantially as and for the purpose specified.

In testimony that I claim the above I have hereunto subscribed my name in the presence of two witnesses.

CLARK B. WAY.

Witnesses:
  DANIEL FUNCK,
  ELLA LANDERS.